United States Patent Office 3,577,560
Patented May 4, 1971

3,577,560
METHOD OF FORMING PELLETS OF A FLUX COMPOSITION
Garth D. Lawrence, Midland, and Jack J. Ott, Hemlock, Mich., assignors to The Dow Chemical Company, Midland, Mich.
No Drawing. Filed Mar. 27, 1968, Ser. No. 716,359
Int. Cl. B01j 2/02
U.S. Cl. 264—8     5 Claims

ABSTRACT OF THE DISCLOSURE

The present invention comprises a method of preparing a pelleted flux product by melting a flux composition while maintaining a continuous cover of unmelted flux over the molten portion, forming the melt into molten droplets, and solidifying the droplets into discrete particles or pellets.

PRIOR ART

Conventional flux compositions have heretofore been prepared by fusing the flux constituents into a solid mass and then crushing or grinding the flux mass until the desired particle size is reached. Flux prepared and ground in this manner, however, normally contains a fraction of very fine, nonspherical, particles, e.g., having a longest dimension of less than about 5 microns, which when the flux is used to cover, for example, a melt of metal, comes off as dust due to the convection currents over the pot. This not only results in loss of a portion of the flux but it also creates an irritating, if not toxic or corrosive, atmosphere around the melting area.

An object of the present invention is to provide a novel method of preparing a particulate flux product.

THE INVENTION

In accordance with the present invention the above and other objects and advantages are obtained in a novel method of preparing said pelleted, fused flux which comprises: melting a flux composition while maintaining a continuous layer of unmelted flux composition as a solid cover over the melted flux, said layer being a minimum of about ½ inch in thickness, forming the flux so-melted into molten droplets, and solidifying said droplets into fused, dustless, discrete pellets. These pellets are surprisingly dustless as compared to a fused-ground flux composition. Moreover, they are free flowing, readily stored, and easily handled, as well as being less toxic to foundry personnel where such pellets may be used as a cover in melting for example magnesium.

Flux compositions or flux formulations which may be processed in accordance with the present method into dustless granule products, include those normally employed in melting primary magnesium and magnesium base alloys as practiced by those skilled in the metallurgical arts, including the aforesaid previously fused and ground flux compositions. Specific flux compositions susceptible of being processed in accordance with the present invention to provide a dustless, pelleted product include, for example, a flux containing by weight 55 percent KCl, 34 percent $MgCl_2$, 9.0 percent $BaCl_2$, 2.0 $CaF_2$, and 5.0 percent NaCl; a flux containing by weight of 20.0 percent KCl, 50.0 percent $MgCl_2$, 15.0 percent $CaF_2$, and 15.0 percent MgO; a flux containing by weight 10–13 percent MgO, 34 percent KCl, 7–10 percent $BaCl_2$, 9–12 percent $CaF_2$, and 27–31 percent $MgCl_2$. The process of the present invention is particularly effective on a flux containing by weight 50 percent $MgCl_2$, 25 percent $KCl_2$, 20 percent $BaCl_2$, and 5 percent $CaF_2$, as it prevents hydrolysis, which apparently causes frothing, of the $MgCl_2$ to MgO and this process thereby prevents flux composition change.

In carrying out the novel method of the present invention the flux to be processed is first melted to form a molten supply thereof and is maintained temporarily in the melting pot at a temperature preferably a few centigrade degrees, e.g., from 5 to 10° C., above its melting point. In so-melting the flux it is essential to maintain a continuous layer of at least about ½ inch of unmelted flux over the flux already melted and to continuously replenish said layer as the flux melts and becomes molten in the region of the interface between the molten material and unmelted material. Accordingly, melting of the flux composition takes place from the lower portion of the unmelted layer of the flux covering. If this sequence of melting steps is observed in accordance herewith a smooth transition from unmelted to melted material occurs. Conversely, if the flux composition is melted without maintaining a continuous layer of unmelted flux at the melt surface, the flux froths and foams excessively to the extent that the foam generated literally boils out of the pot covering the melting equipment and surrounding area, wasting much of the flux composition. This is illustrated in the working examples and comparative examples which follow hereinafter. Accordingly, any flux composition which normally exhibits a detrimental frothing or foaming upon being melted may be advantageously employed in the present method to avoid such difficulties.

After the flux composition has been melted as described, it is formed into fused pellets by means of, for example, jet or disc-type atomizing. In jet atomizing, a continuous stream of the molten flux is funneled or released through a small hole by gravity flow, or applied pressure, from a supply thereof and is intercepted by a high velocity jet of a non-reactive gas, such as for example, air or an inert gas, or natural gas. The jet of gas not only disperses the molten flux into fine droplets but also facilitates cooling and solidification of said droplets into solid fused pellets. The pelleted product so-derived, being fused, is characterized by an unusual property of being essentially dustless.

Another suitable method or means for causing the molten flux to be formed in the pellets is by wheel atomizing in which a stream of molten flux is directed, normally by gravity flow, onto the surface of a disc within an enclosed zone, thereby causing the molten flux to form into droplets which solidify after being flung off the disc into pellets before reaching or landing at the bottom of the aforesaid zone. Other means for pelletizing the flux into a fused granule includes prilling in which the molten flux is directed against for example, a fine screen or grid thereby causing the flux to form into a multiplicity or spray of droplets which solidify thereafter into pellets. Other suitable atomizing means may also be employed in accordance with the present invention provided said atomizing of the flux is from the molten state.

The pellet product produced by the novel method of the present invention and may be characterized as an essentially completely fused mixture of a flux composition as discrete, essentially spherical, particles or granules. While the size of the granule is not particularly limited in any way, a preferable or optimum particle size may range, for example, from about 0.004 to about 0.10 inch in cross-sectional dimension. As is illustrated by the examples hereinafter, dusting of the novel particulate flux composition of the present invention as compared to a ground fused flux composition prepared conventionally is reduced very significantly, for example by a reduction in the order of 2 to 3 times, due to the absence in the novel pelleted flux of the very fine particles found in the ground flux and due to the spherical shape of the particles which are less affected by convention current over the melting pot.

Furthermore, because the average size of the novel pelleted flux is smaller, the flux melts faster and covers the melt metter than the ground flux without the attendant disadvantages of dusting.

The following examples are representative of the present invention and best mode thereof and are not intended to be construed as limiting the invention thereto.

EXAMPLES 1-2

Ground, fused flux containing $MgCl_2$, KCl, $BaCl_2$, $CaF_2$, and MgO was melted in an atomizer head pot while maintaining a 1 inch thick cover of solid flux over the molten flux. The molten flux was allowed to run through a 5/32 inch orifice where it was atomized into droplets by a high velocity air jet. No frothing was noticed once the molten flux was covered with a layer of solid flux. The ground flux starting material and the resulting pelleted flux of the present invention were analyzed for composition (weight percent). The results are shown below.

| Example No. | Composition | | | | |
|---|---|---|---|---|---|
| | $MgCl_2$ | KCl | $BaCl_2$ | $CaF_2$ | MgO |
| Ground flux (starting material) | 46.0 | 26.6 | 19.0 | 3.14 | 3.68 |
| 1 | 45.8 | 26.5 | 19.3 | 3.18 | 3.71 |
| 2 | 45.8 | 26.5 | 19.3 | 3.17 | 3.71 |

A comparison of the ground flux starting composition and the pelleted flux composition shows that the method of the present invention prevents hydrolysis of $MgCl_2$ to form MgO. The frothing which can occur when the method of the present invention is not employed is apparently due to this hydrolysis.

Furthermore, while the average particle size of the pelleted flux is smaller as compared to the ground flux, it was noticed upon pouring a sample of each that the ground flux produced a substantial amount of air borne dust while the pelleted flux was essentially dustless. Fifty cc. samples of both ground and pelleted flux were poured into 250 ml. graduates. The height of the dust cloud from the ground flux measured greater than 20 inches, going out of the top of the graduate and the dust required 80–100 seconds to settle. The height of the dust cloud of the pelleted flux measured 7.5–10 inches and the dust settling time was only 39–63 seconds. Moreover, because of its pelleted form, the resulting novel flux product is more free flowing and covers the melt better than the conventional ground flux.

EXAMPLES A-B—CONTROL

Raw materials for a flux composition containing $MgCl_2$, KCl, $BaCl_2$, $CaF_2$ and MgO were melted in an atomizer head pot without a solid layer of flux of the same composition as a cover and thus not within the method of the present invention. The molten flux was then atomized into droplets through a spinning wheel atomizer to form solid pellets of flux. Composition analysis (wt. percent) made on the pelleted product is shown below.

| Example No. | Composition, wt. percent | | | | |
|---|---|---|---|---|---|
| | $MgCl_2$ | KCl | $BaCl_2$ | $CaF_2$ | MgO |
| Nominal | 45–53 | [1] 20 | 18–24 | 2–5 | [2] 4 |
| A—Control | 34.5 | 30.9 | 22.9 | 3.2 | 6.7 |
| B—Control | 34.5 | 33.2 | 22.8 | 3.1 | 6.7 |

[1] Minimum.
[2] Maximum.

Without the protective cover of solid flux as specified in the method of the present invention, the $MgCl_2$ was hydrolyzed to form MgO thereby detrimentally changing the flux composition. As shown in Examples 1 and 2, the present invention prevents such changes in flux composition since hydrolysis is substantially eliminated by the present novel process.

In a similar manner other flux compositions may be melted, formed into molten droplets and solidified to produce a dustless, fused, spherical granulated flux.

The present invention may be modified or changed without departing from the spirit or scope thereof and it is understood that the invention is only limited as defined in the appended claims.

What is claimed is:

1. A method of forming pellets of a metallurgical flux composition which is subject to frothing upon melting, comprising:
   (a) melting said flux composition while maintaining a continuous solid unmelted cover layer of said flux of at least about one-half inch in thickness over the melted flux to thereby prevent frothing of said melted flux,
   (b) forming said melted flux composition into molten droplets, while continuously replenishing said layer of solid flux cover to maintain said solid flux cover thickness, and
   (c) solidifying said droplets of molten flux to form said pellets.

2. The method of claim 1 in which the molten flux is formed into molten droplets by jet atomizing.

3. The method of claim 1 in which the molten flux is formed into molten droplets by wheel atomizing.

4. The method of claim 1 in which the molten flux is formed into molten droplets by prilling.

5. The method of claim 1 in which the flux composition consists essentially by weight of about 50 percent $MgCl_2$, about 25 percent KCl, about 20 percent $BaCl_2$, and about 5 percent $CaF_2$.

References Cited

UNITED STATES PATENTS

| 1,338,734 | 5/1920 | Johnson | 264—12 |
| 1,894,208 | 1/1933 | Von Girsewald et al. | 264—12 |
| 1,951,790 | 3/1934 | Curran | 264—13 |
| 2,304,130 | 12/1942 | Truthe | 264—8 |
| 2,371,105 | 3/1945 | Lepsoe | 264—12 |
| 3,058,159 | 10/1962 | Ishizuka et al. | 264—13 |

ROBERT F. WHITE, Primary Examiner

J. R. HALL, Assistant Examiner

U.S. Cl. X.R.

264—12, 13